2,712,545

SALTS OF EPOXY DICARBOXYLIC AMINO ACIDS

Frederick C. Bersworth, Framingham Center, Mass., assignor to The Dow Chemical Company, Midland, Mich., a corporation of Delaware No Drawing. Application April 30, 1954,
Serial No. 426,925

5 Claims. (Cl. 260—348)

This invention relates to a class of amino acids and particularly to certain polycarboxylic amino acid chelating agents and has for its object the provision of new types of such acids and salts conforming to the following formula:

wherein R is an alkyl group containing a plurality of carbon atoms in the form of a straight or branched chain, which number in the chain may run as high as 10 to 20 or more, on two adjacent carbon atoms of which there is attached an oxygen atom

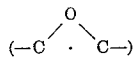

and wherein at least one H has been displaced by an acid group, preferably an acetic or propionic acid group such as —$CH_2.COOM$ or —$CH_2CH_2.COOM$, wherein M is an alkali metal, ammonium or an amine.

Another object is to provide new type metal ion chelating agents conforming to the above formula which are soluble in alcohol, ether and liquid hydrocarbons as well as in water.

A further object is to provide epoxy alkyl amino acid salts conforming to the above formula having a chemically active epoxy group therein adapting the compound for wide utility in the art of organic synthesis.

Other objects will be apparent as the invention is more fully hereinafter disclosed.

This application is a continuation-in-part of my applications Serial Nos. 386,648 and 281,897, both now abandoned, which are continuations-in-part of my application Serial No. 99,365 filed June 15, 1949, now abandoned, and entitled "Ep-oxy Aliphatic Amino Acids and Method of Manufacturing Same." In this said parent application I have disclosed a method of producing epoxy aliphatic amino acids in which a polyhydroxy mono or poly amine having at least one displaceable amino hydrogen and having at least two hydroxyl groups in the alkyl carbon chain thereof attached to two adjacent carbon atoms, is carboxy-methylated, preferably by the process disclosed and claimed in my prior Patent No. 2,407,645 issued September 17, 1946, and the hydroxyalkyl amino acid salt thereby obtained is recovered from the reaction solution, preferably by evaporating off the water of solution at low temperatures and under high vacuo, and dehydrated as to the adjacently located hydroxyl groups in the alkyl group by suspending the substantially dry salt in xylene or toluene and heating the suspension under a refluxing condenser at a temperature within the range 100°–130° C. at which an azeotropic mixture of water and xylene (or toluene) distills off for a time interval sufficient to substantially completely dehydrate these hydroxyl groups thereby converting the alkyl amino acid salt into an epoxide conforming to the above formula.

After the compound has been completely converted over to the epoxide in this manner, the epoxide is recovered from the xylene (or toluene) suspension remaining by filtration and drying in high vacuo, as a white amorphous powder that is readily and completely soluble in water, alcohol, ether and in liquid hydrocarbons, in which solvents it is highly reactive as a metal ion chelating agent towards metal ions present in the solvent.

In this type of compound the epoxy group

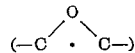

present in the alkyl group is a highly reactive group chemically independently of the acetate group or groups attached to the amino nitrogen and may be variously reacted to form new type amino acids of great utility in organic synthesis.

The chelate-forming properties of the di-acetate epoxide is greater than that of the mono-acetate epoxide. However, where one of the amino hydrogens of the epoxide has been displaced by a solubilizing group other than R or acetate in the above formula, the chelate-forming properties of the mono-acetate epoxide are improved materially.

There are a large number of epoxy aliphatic amino acid salts conforming to the above generic formula and the following examples are believed sufficient to enable one skilled in the art to produce the same by any one of the alternative procedures described.

The method of synthesis of the epoxy compound is essentially the carboxy methylation of a hydroxy-alkyl amine and the starting material which determines the length of the alkyl chain in the epoxy compound is the particular amine chosen. For example, where it is desired to have a 16, 18 or 20 carbon atom chain on the final epoxy compound, it is necessary to start with a compound such as a dihydroxy amine corresponding to the following formula:

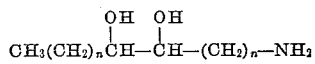

wherein the $n$'s have values such that the desired chain length is reached. The length of the alkyl chain on the amine does not affect the carboxy-methylation, for the addition of the acid group in place of the replaceable amino hydrogens takes place readily under the conditions defined, and, at the same time, dehydration of the hydroxy groups occurs to form the epoxy compound. The effect of lengthening the alkyl chain in which the epoxy group occurs is to affect the final physical properties of the compound. Thus, where the chain length becomes 10 or more carbon atoms and, particularly, when it reaches in length to about 16 to 18 carbon atoms, marked surface activity of the compounds is noted. In the synthesis described herein, it is to be understood, therefore, that although specific dihydroxy propyl and butyl amines were used; the principle of the synthesis applies to longer alkyl chains and essentially the same barboxy-methylation reaction is carried out to form epoxy compounds having 16, 18 or 20 carbon atoms in the group. Also the synthesis is carried out in a strongly alkaline medium so that the compound is formed as an alkali metal salt. Conversion to the acid form is readily accomplished by acidifying a solution of the compound with mineral acid, or by means of conventional ion exchange techniques wherein the alkali metal ion is removed.

Example 1

As one specific embodiment of the present invention, but not as a limitation thereof, the method of producing alpha, beta, epoxy propylamine di-acetic acid di-sodium salt, in accordance with the method of my prior patent modified as above disclosed, will be described. This compound conforms to the formula:

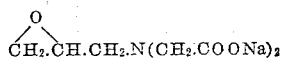

In producing this compound one molar weight of alpha, beta di-hydroxy propylamine is added to 400 cubic centimeters of water and the mixture is placed in a glass flask provided with a gas exhaust connection feeding gas from the flask interior into an ammonia collection tower.

To the solution two (2) molar weights of sodium cyanide are added and sufficient sodium hydroxide to provide a pH of 7.4–8.5 to the reaction solution also is added. The solution then is heated to 80°–85° C. and two (2) molar weights of formaldehyde are slowly added to the reaction solution with vigorous agitation of the solution during the formaldehyde addition. The rate at which the formaldehyde is added is that rate which will maintain a strong free flow of $NH_3$ gas into the ammonia absorption tower.

After the formaldehyde has been completely added the reaction solution is maintained at the reaction temperature of 80°–85° C. for an extended time interval with continued stirring to permit the chemical reactions involved to go to completion.

The water of solution is then removed from the reaction solution by extended heating at 40°–50° C. in a high vacuum and the anhydrous product is suspended in 500 cubic centimeters of xylene (or toluene) and heated with vigorous agitation to 110° C. under a distillation head until no further distillate of an azeotropic mixture of water and xylene (or toluene) is obtained therefrom.

The resulting product is separated from the xylene (or toluene) remaining in the flask, preferably by vacuum filtration, and is dried in high vacuo to remove the last traces of the xylene (or toluene) therefrom.

The compound obtained in the above specific example is the alpha, beta epoxy diacetic amino acid disodium salt conforming to the following formula:

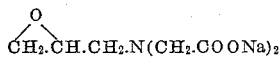

Depending on the care with which the process is practiced and the purity of materials employed, the recovery of this compound is substantially 100 percent of the theoretical. The compound is a white amorphous product readily soluble in water, alcohol, ether and in liquid hydrocarbons. In aqueous solutions the acetic acid groups are the solubilizing groups for the compound, whereas in alcohol, ether and liquid hydrocarbons the epoxide alkyl group is the solubilizing group of the compound.

In aqueous solutions the epoxide tends to rehydrate to the hydroxy amino acid which tendency increases with increase in pH above pH 7 and decreases with decrease in pH below pH 7. In acid pH solutions the epoxide tends to form polymer compounds of uncertain composition. In alkaline pH solutions the chelating properties of the compound appear to stem from the hydroxy groups and one acetic acid group with the other acetic acid group acting as a solubilizing group for the metal chelate compound.

In alcohol, ether and liquid hydrocarbons, the chelating properties of the compound appear to be limited to the acetic acid groups and to be based on the relative displacement properties of the metals in this medium. The alkyl group appears to function as the solubilizing group in these media and to some extent as a dehydrating agent for these media.

The free acids of any of the compounds are obtained by acidifying a solution of the salt and recovering the free acid from that acidified medium. Generally, mineral acids such as HCl and $H_2SO_4$ are used for the acidification.

*Example II*

When 3,4,-dihydroxy butylamine is completely carboxymethylated to the diacetic acid disodium salt, by the same process above described in Example I, the salt, after its recovery from the reaction solution by evaporation in high vacuo and dehydration of the adjacent hydroxyl groups to the epoxide as described in Example I, conforms to the following formula:

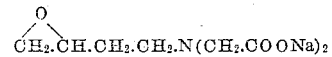

This salt also is a white amorphous compound readily soluble in the same solvents as described for the compound of Example I.

*Example III*

When 3,4 dihydroxy hexylamine is used and is completely carboxymethylated by the process of Example I, and the recovery procedure followed, the following compound is obtained.

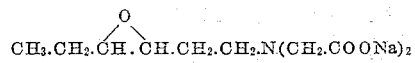

*Example IV*

Similar synthesis with higher molecular weight hydroxy amines produces parallel results. Higher molecular weight amines and mixtures thereof are readily available as derivatives of fats. Amines from such sources in mixtures will contain alkyl groups having 12 to 18 carbon atoms. Mixtures of amines may be reacted to obtain useful products comprising mixtures of the carboxymethylated compounds, which for many operations involving their use as chelating agents are as useful as pure compounds.

A typical 12 carbon hydroxy amine is the following:

$$CH_3(CH_2)_4CHOHCHOH(CH_2)_5NH_2$$

which upon carboxymethylation gives the following:

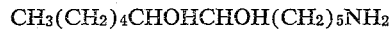
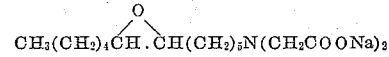

A typical 18 carbon hydroxy amine is the following:

$$CH_3(CH_2)_7CHOHCHOH(CH_2)_7CH_2NH_2$$

which upon carboxymethylation gives the following:

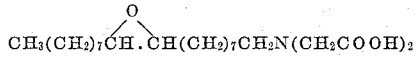

When unsaturated amines are used, the procedure is to select that which will give a side chain of desired length. For example, starting with $$CH_3CH_2CH=CHCH_2CH_2CH_2CH_2CH_2NH_2$$

the compound is treated with hypochlorous acid which adds to the unsaturation and then the elements of HCl are removed by treatment with NaOH to give the corresponding dihydroxy amine, which is carboxymethylated and converted to the epoxy compound as described.

*Example V*

As an example of a somewhat different method of obtaining epoxides of this type, 1-chloro-2-butene is treated with the disodium salt of imino diacetic acid in aqueous ethanol under a refluxing condenser at the refluxing temperature of ethanol. One mole of each of the reactants is employed and about 0.55 mole of sodium carbonate is used as a buffer. The volume of the solution is about one liter. About 3 hours is required to complete the reaction at the reflux temperature of the ethanol (90° C.). The reaction product is isolated in the anhydrous form by evaporating to about 250 cc. and adding 800 cc. of 95 percent ethanol. The resulting disodium salt of 1 amino-2-butene-N,N-diacetic acid is then suspended in a liter of dioxane and treated with a mole of benzoyl peroxide. After agitation for a few hours, the product is allowed to stand in the reaction mixture for 5 hours more. The solid reaction product resulting is filtered and washed with a little cold ethanol. Its structure corresponds to the formula:

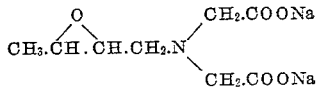

Just as the synthesis described in Example I is generally applicable to hydroxy amines, so the synthesis of Example V is generally applicable to the preparation of higher molecular weight compounds. For example, in place of the chloro butene, there may be used the dichloro octane

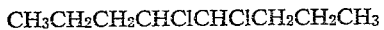

to obtain the corresponding imino diacetic acid compound.

The epoxides hereinabove disclosed are very useful in the synthesis of various chemical products and in the formation of high molecular weight compounds. They react with water and alcohols to form hydroxy and alkoxy amino acid salts which are effective metal deactivators. With ammonia and amines, derivatives are produced which are still more effective for deactivating transition metals. With polyalcohols and polyamines high molecular weight (resinous) compounds are formed which are also effective metal deactivators.

The free acids of these epoxides polymerize on heating to give resinous materials having considerable capacity for adsorbing and deactivating various metals.

Having hereinabove disclosed the present invention generically and specifically and having given five (5) specific embodiments of the same, it is believed apparent that the invention may be widely modified and adapted without essential departure therefrom, and all such modifications and adaptations of the invention are contemplated as may fall within the scope of the following claims.

What is claimed is:

1. The epoxide compound conforming to the following formula:

wherein R is an alkyl group containing at least two carbon atoms, on two adjacent carbon atoms of which there is attached an oxygen atom

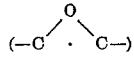

wherein at least one of the amine hydrogens is displaced by a carboxylic group selected from the group consisting of —CH$_2$.COOM or —CH$_2$CH$_2$.COOM, wherein M is one of the group consisting of hydrogen, alkali metals and ammonium bases.

2. The disodium salts of 2,3-epoxy-propylamine-N,N-diacetic acid having the formula:

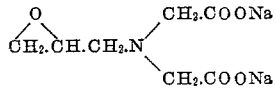

3. The disodium salt of 3,4-epoxy 1-aminobutane-N,N-diacetic acid having the formula:

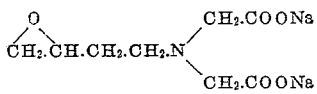

4. The disodium salt of 2,3-epoxy-1-amino butane-N,N-diacetic acid having the formula:

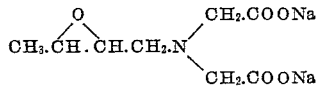

5. The method of producing epoxide alkyl monoamino acid alkali metal salts which comprises suspending a polyhydroxy alkyl mono-amino acid alkali metal salt in one of the fluid media of the group consisting of xylene and toluene and heating the suspension for an extended time interval at a temperature within the range 100°–130° C. at which an azeotropic mixture of water and the media distils off and maintaining the heating until such mixture is completely distilled off from the suspension.

No references cited.